A. RITTENHOUSE.
Improvement in Saw-Guides.

No. 114,346.  Patented May 2, 1871.

Inventor,
Aaron Rittenhouse

Witnesses —
Geo. W. Riblitts
J. Holmes

United States Patent Office.

AARON RITTENHOUSE, OF SMITHVILLE, OHIO.

Letters Patent No. 114,346, dated May 2, 1871; antedated April 28, 1871.

IMPROVEMENT IN SAW-GUIDES.

The Schedule referred to in these Letters Patent and making part of the same.

*To all whom it may concern:*

Be it known that I, AARON RITTENHOUSE, of Smithville, in the county of Wayne and State of Ohio, have invented an Improvement on a Saw-Guide, a patent for which was granted to H. P. Dillingham December 10, 1867; and I do hereby declare that the following is a full and complete description of the construction of the same, reference being had to the accompanying drawings making a part of this specification, in which—

Like letters of reference refer to like parts.

Figure 1:
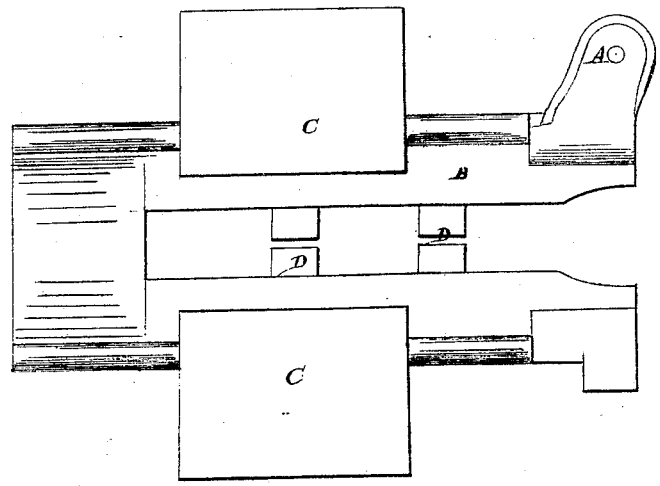
Figure 1 is a plan view.
Figure 2:
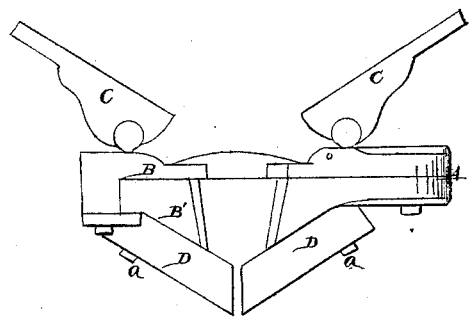
Figure 2 is an end view.

The nature of my improvement consists in changing the construction of the guide by making the joint or pivot, hereafter referred to, upon one side, leaving an open space in front, by which the saw may be easily removed when desired through the opening without the necessity of the guide being removed or disturbed.

The general construction and form of this guide is the same as the one above referred to, with this difference: the joint or pivot A is placed to one side instead of in the center, for a purpose hereafter described.

B represents the upper part of the guide, which is pivoted or jointed to the under side at the point A.

C C are the arms by means of which the guide is secured to the beams in which the pitman of the saw slides, and may be adjusted as described.

The ways D D are secured to the under side of the guide, and between which the saw moves.

These ways can be adjusted to the thickness of the saw by means of set-screws *a a*. Thus a very thin saw can be run with safety and a large amount of timber be saved.

The parts B B' of this guide are pivoted together, as in the patent referrred to, thus allowing them to move sidewise, and thus prevent all binding of the saw when in operation, the pivot A, as beforesaid, in the old invention being near the center, while in this it is to one side of the guide.

The advantage of this change is as follows:

When it is desired to remove the saw from the old guide the said guide must first be removed or detached, as the end is closed by means of the joint A; but with this improvement the saw can be easily moved out of the guide, the end being left open for that purpose, and the joint is as convenient and useful at the side as near the center.

I hereby disclaim the invention of H. P. Dillingham, as claimed by him in his patent No. 71,859; but What I do claim, and desire to secure by Letters Patent, is—

The saw-guide constructed as herein shown and described, having the pivot A upon one side of the guide, as and for the purpose specified.

AARON RITTENHOUSE.

Witnesses:
GEO. W. TIBBITTS,
J. HOLMES.